United States Patent
Dina

(10) Patent No.: US 9,601,152 B2
(45) Date of Patent: Mar. 21, 2017

(54) ADDITIONAL OVERSHOOT CURRENT HDD WRITE DRIVER CIRCUIT

(71) Applicant: Texas Instruments Incorporated, Dallas, TX (US)

(72) Inventor: Marius V. Dina, Inver Grove Heights, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/974,125

(22) Filed: Dec. 18, 2015

(65) Prior Publication Data

US 2016/0260455 A1 Sep. 8, 2016

Related U.S. Application Data

(60) Provisional application No. 62/129,577, filed on Mar. 6, 2015.

(51) Int. Cl.
| | |
|---|---|
| *G11B 15/12* | (2006.01) |
| *G11B 20/10* | (2006.01) |
| *G11B 5/09* | (2006.01) |
| *G11B 5/02* | (2006.01) |
| *G11B 19/02* | (2006.01) |
| *G11B 5/012* | (2006.01) |
| *G11B 15/02* | (2006.01) |

(52) U.S. Cl.
CPC .......... *G11B 20/10222* (2013.01); *G11B 5/09* (2013.01); *G11B 5/012* (2013.01); *G11B 5/022* (2013.01); *G11B 15/02* (2013.01); *G11B 19/02* (2013.01)

(58) Field of Classification Search
None
See application file for complete search history.

(56) References Cited

U.S. PATENT DOCUMENTS

| | | | | |
|---|---|---|---|---|
| 2007/0206306 | A1* | 9/2007 | Hokuto | G11B 5/02 360/46 |
| 2008/0266696 | A1* | 10/2008 | Dina | G11B 5/012 360/55 |
| 2013/0308222 | A1* | 11/2013 | Dina | G11B 5/09 360/55 |
| 2014/0226234 | A1* | 8/2014 | Livshitz | G11B 5/02 360/46 |
| 2016/0260454 | A1* | 9/2016 | Dina | G11B 5/09 360/61 |

* cited by examiner

*Primary Examiner* — Tan X Dinh
(74) *Attorney, Agent, or Firm* — Lawrence J. Bassuk; Charles A. Brill; Frank D. Cimino

(57) ABSTRACT

A hard disk drive write drive method and integrated circuit that provide a configurable overshoot current based on the length of the pattern in the write current signal that is being written to the hard disk by the write driver. The hard disk write driver adds a first overshoot current to all patterns in the write current signal and adds an additional second overshoot current to patterns in the write current signal shorter than a first duration. The hard disk drive write driver utilizes an H-bridge circuit configured to add the first overshoot current and the additional second overshoot current to the write current signal. The H-bridge circuit is comprised of four switching elements that are configured to generate a first overshoot current for all pattern transitions of the write current signal and generate a second overshoot current for pattern transitions shorter than the first duration.

4 Claims, 10 Drawing Sheets

ADDITIONAL OVERSHOOT CURRENT HDD WRITE DRIVER CIRCUIT

CROSS-REFERENCE TO RELATED APPLICATIONS

The present application claims the benefit of the filing date of Provisional Application No. 62/129,577, filed Mar. 6, 2015.

TECHNICAL FIELD

The recited claims are directed, in general, to hard disk drives and, more specifically, to the write operations of a hard disk drive.

BACKGROUND

A hard disk drive (HDD) is used for storing digital data. An HDD typically stores the data on one or more disks or platters that are made of magnetic material or have surfaces coated with a magnetizable material. Write heads are utilized by an HDD to magnetize regions of the disks to store information and read heads are utilized to detect the magnetization of a region in order to retrieve stored information.

A write current signal is used to transmit data to a write head, which then encodes the received data onto a platter. The write current signal is generated by a write driver circuit. The transmitted data is encoded by the write driver in the write current signal using current pulses, thus forming a pulse train in the write current signal. The higher the frequency of the current pulse, the faster data can be transmitted to the write head of the HDD. A constraint on increasing this frequency is the speed at which the write head is able read the data from the write current signal.

A limitation on the speed at which the write head can read incoming data from the write current signal is the imperfection of the square pulse that comprise a pulse train data transmission. Components used in commercial electronics for the generation of square waves are not capable of generating perfect square waves. In particular, the leading edge of each transition that forms a square pulse is commonly distorted. Additionally, the squares of a pulse train may be further distorted during the transmission of the data to the write head. The higher the frequency of the pulse train, the greater the distortion of the square pulses that form the pulse train.

The distortion of the pulse train is degradation of the leading edge of each transition in the pulse train is particularly problematic in HDD systems. This distortion of the leading edges delays the ability of the write head to correctly discern the new level of the write current after each transition in this signal. Rather than wait for the leading edge distortion to subside and the write current to settle, certain HDDs are configured to utilize an overshoot current. An overshoot current is added to the write current at each state transition of the write current. This serves to compensate for degradation of the leading edges of these state transition of the write current signal. The write head may then be configured to take advantage of this overshoot adjustment such that frequency of the write current signal and the speed of the write head can be increased.

Conventional HDD systems that utilize overshoot adjustments typically introduce an overshoot current at every state transition of the write current signal. Additionally, in these conventional HDD systems, an identical overshoot current is added for every overshoot adjustment to the write current signal. There is a need for HDD systems that are capable of providing a more flexible application of overshoot adjustments to the write current signal.

SUMMARY OF THE INVENTION

According to various embodiments, a write driver for use in an HDD system is disclosed. The write driver is configured to provide overshoot adjustments to the write current signal whereby different overshoot currents can be utilized for different types of state transitions in the write current signal. According to certain embodiments, the write driver adds a standard overshoot current to the leading edge of a first category of state transitions in the write current and the write driver adds an additional overshoot current to the leading edge of state transitions of a second category. In certain embodiments, the first category of state transitions are transitions that begin a pattern in the write signal longer than threshold duration and the second category are transitions that begin patterns in the write signal that are shorter than the threshold duration.

According to various embodiments, a hard disk drive write driver method and integrated circuit for generating a write current signal for storing data to a hard disk drive are disclosed. The hard disk drive write driver includes a switching element comprising: a first input operable to receive a first input signal indicating the addition of a first overshoot current to a pattern of the write current signal; a second input operable to receive a second input signal indicating a first time interval associated with the pattern; and an overshoot component operable to add a first overshoot current to the pattern and further operable to further add the second overshoot current to the pattern, if the first time interval is longer than a first duration.

According to various additional embodiments, the first time interval begins at the most recent pattern transition in the write current signal. According to various additional embodiments, the first duration is longer than the shortest pattern used in the write current signal and shorter than twice the length of the shortest pattern used in the write current signal. According to various additional embodiments, the first overshoot current is added based on a clamped voltage level. According to various additional embodiments, the length of the first time interval is determined based on the clamped voltage level. According to various additional embodiments, the first overshoot current is added if the clamped voltage is equal to a first voltage. According to various additional embodiments, the first interval is longer than the first duration if the clamped voltage is equal to a second voltage that is lower than the first voltage.

According to various embodiments, an H-bridge integrated circuit for generate overshoot pulses for pattern transitions in a hard disk write current signal are disclosed. The H-bridge circuit comprising: a first pair of complimentary switching elements that are operable to add a first overshoot current to a pattern of the write current signal based on a first input signal and further operable to add an additional second overshoot current to the pattern of the write current signal based on a second input signal, in which the first input signal and second input signal are received at input terminals of each of the first pair of switching elements; and a second pair of complimentary switching elements that are operable to subtract the first overshoot current from the pattern of the write current signal based on a third input signal and further operable to subtract the additional second overshoot current from the pattern of the write current signal based on a forth input signal, in which the third input signal and fourth input signal are received at input terminals of each of the second pair of switching elements.

According to various additional H-bridge circuit embodiments, the second input signal indicates a first time interval associated with the pattern and the fourth input signal indicates a second time interval associated with the pattern. According to various additional H-bridge circuit embodiments, the first time interval begins at the most recent rising edge pattern transition in the write current signal, and in which the second tune interval begins at the most recent falling edge pattern transition in the write current signal. According to various additional H-bridge circuit embodiments, the first input signal indicates a rising edge in the write current signal, and in which the second input signal indicates a falling edge in the write current signal. According to various additional H-bridge circuit embodiments, in which each switching element of the first pair of complimentary switching elements and the second pair of complimentary switching elements is configured to receive the first overshoot current and the second overshoot current. According to various additional H-bridge circuit embodiments, in which the first overshoot current is added if the first interval is longer than the shortest pattern used in the write current signal and shorter than twice the length of the shortest pattern used in the write current signal.

BRIEF DESCRIPTION OF THE DRAWINGS

Figure 1:
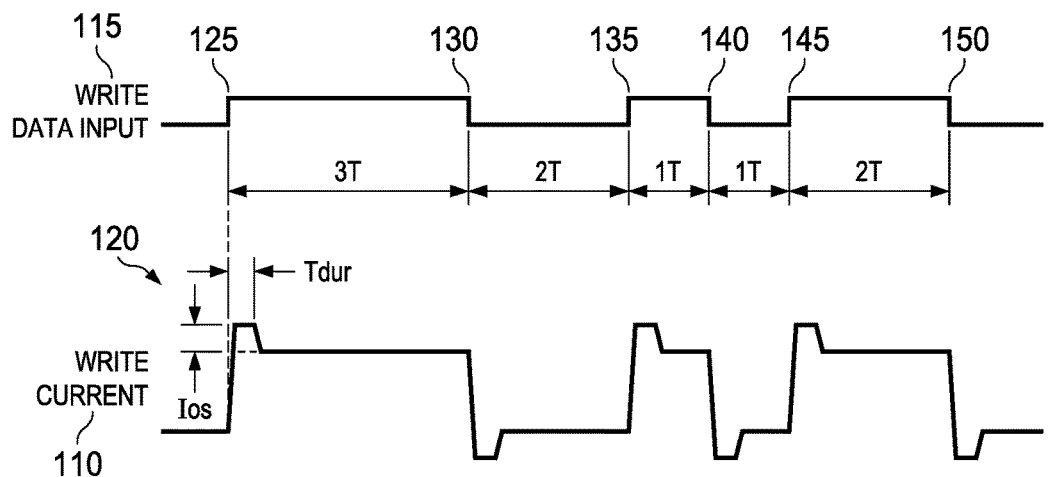

Having thus described the invention in general terms, reference will now be made to the accompanying drawings, wherein:

FIG. 1 depicts waveforms that illustrate the operation of a conventional write driver that provides overshoot adjustments.

Figure 2:
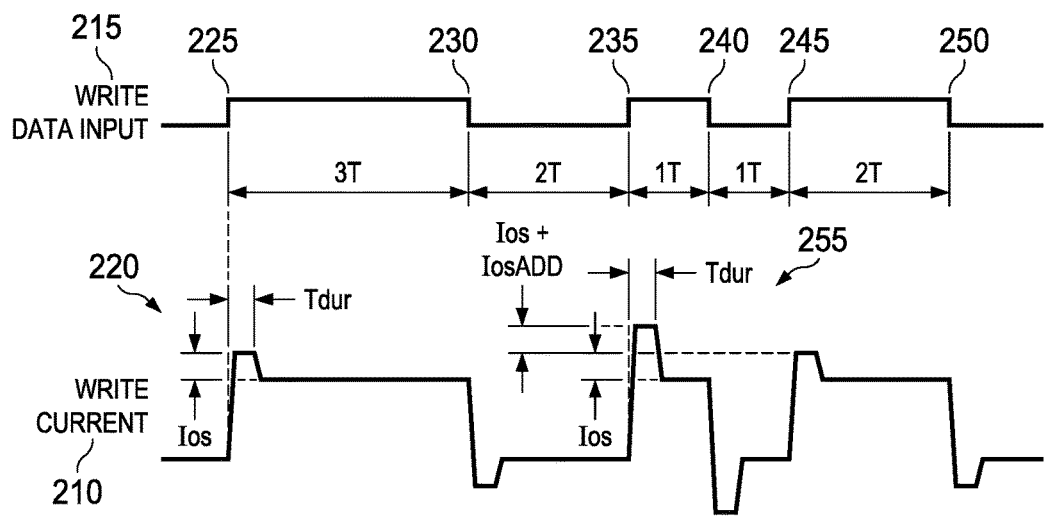

FIG. 2 depicts waveforms that illustrate the operation of a write driver that provides overshoot adjustments according to various embodiments.

Figure 3:
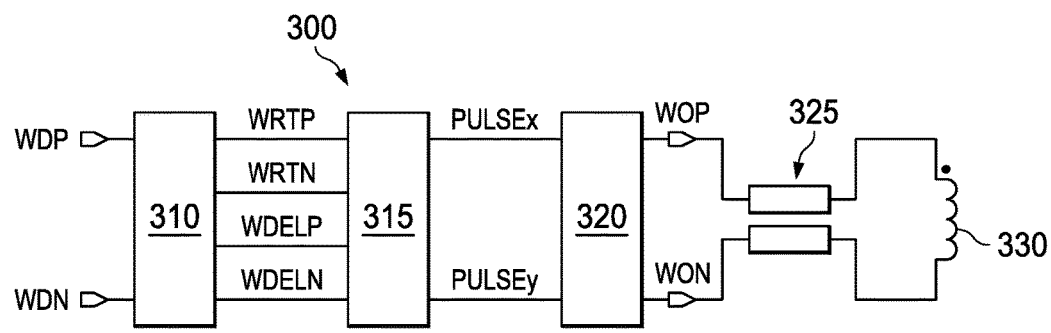

FIG. 3 is a circuit diagram illustrating certain components of a conventional write driver.

Figure 4:
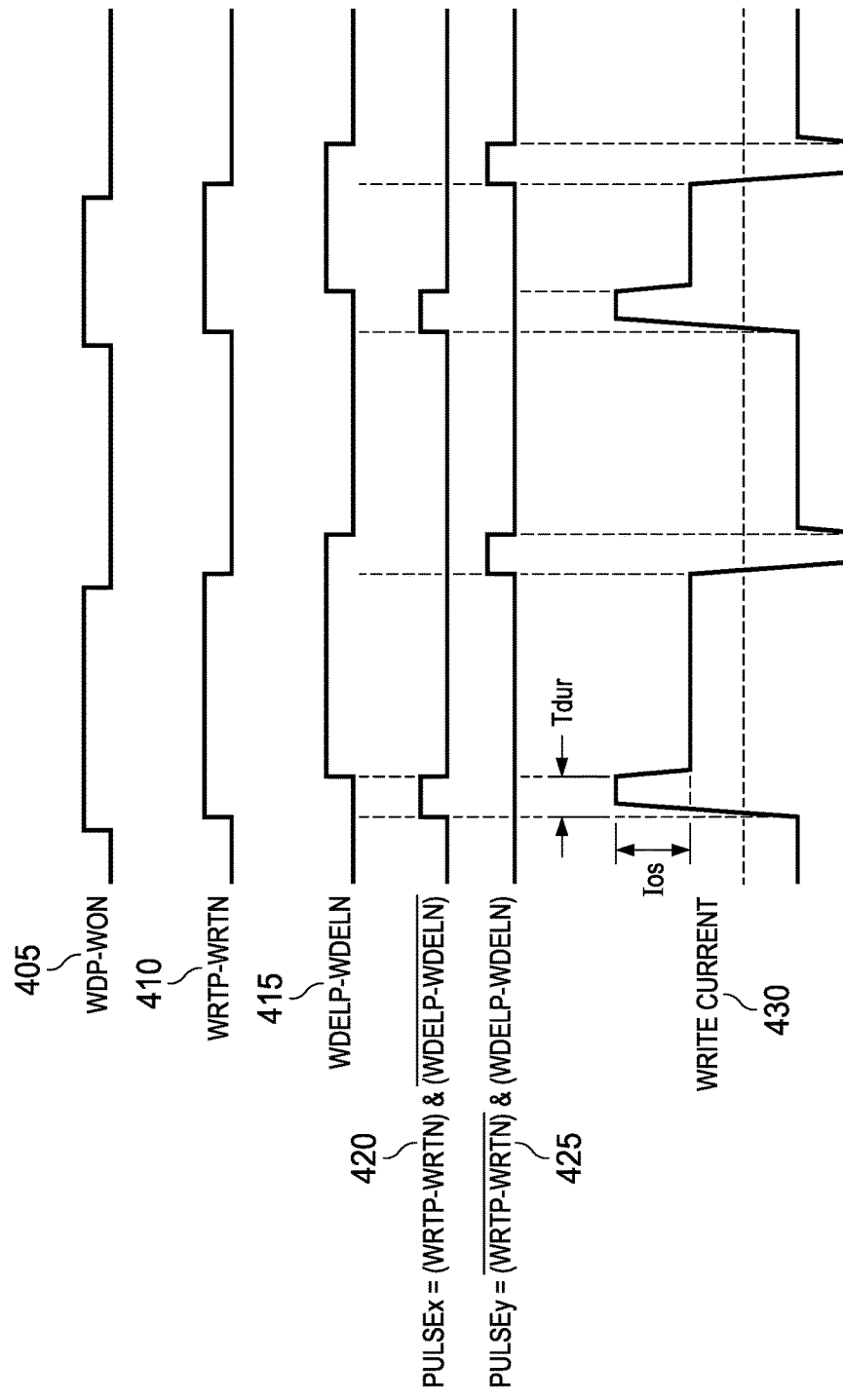

FIG. 4 depicts waveforms that illustrate the generation of overshoot adjustments by the conventional write driver described with respect to FIG. 3.

Figure 5:
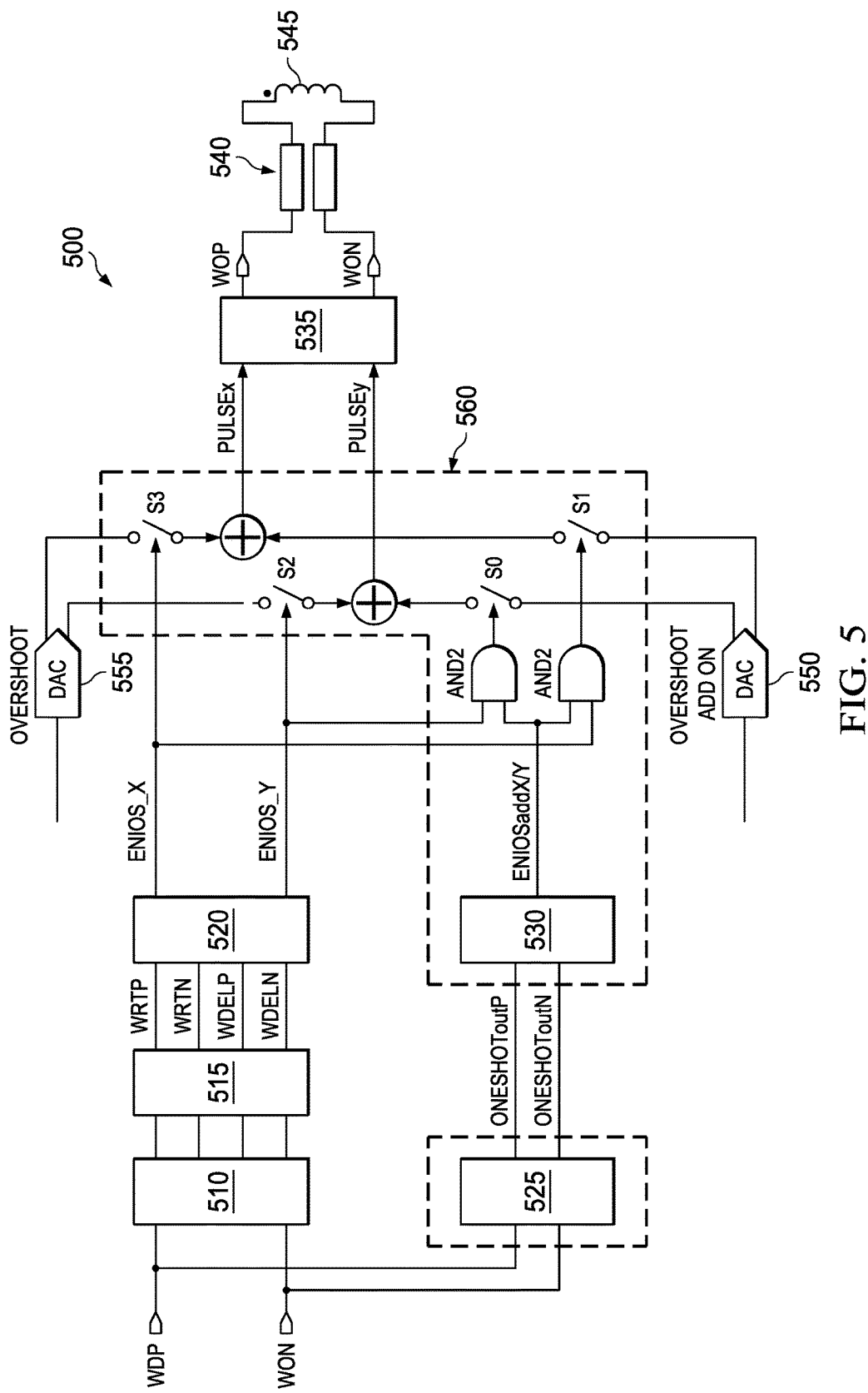

FIG. 5 is a circuit diagram illustrating certain components of a write driver according to various embodiments.

Figure 6:
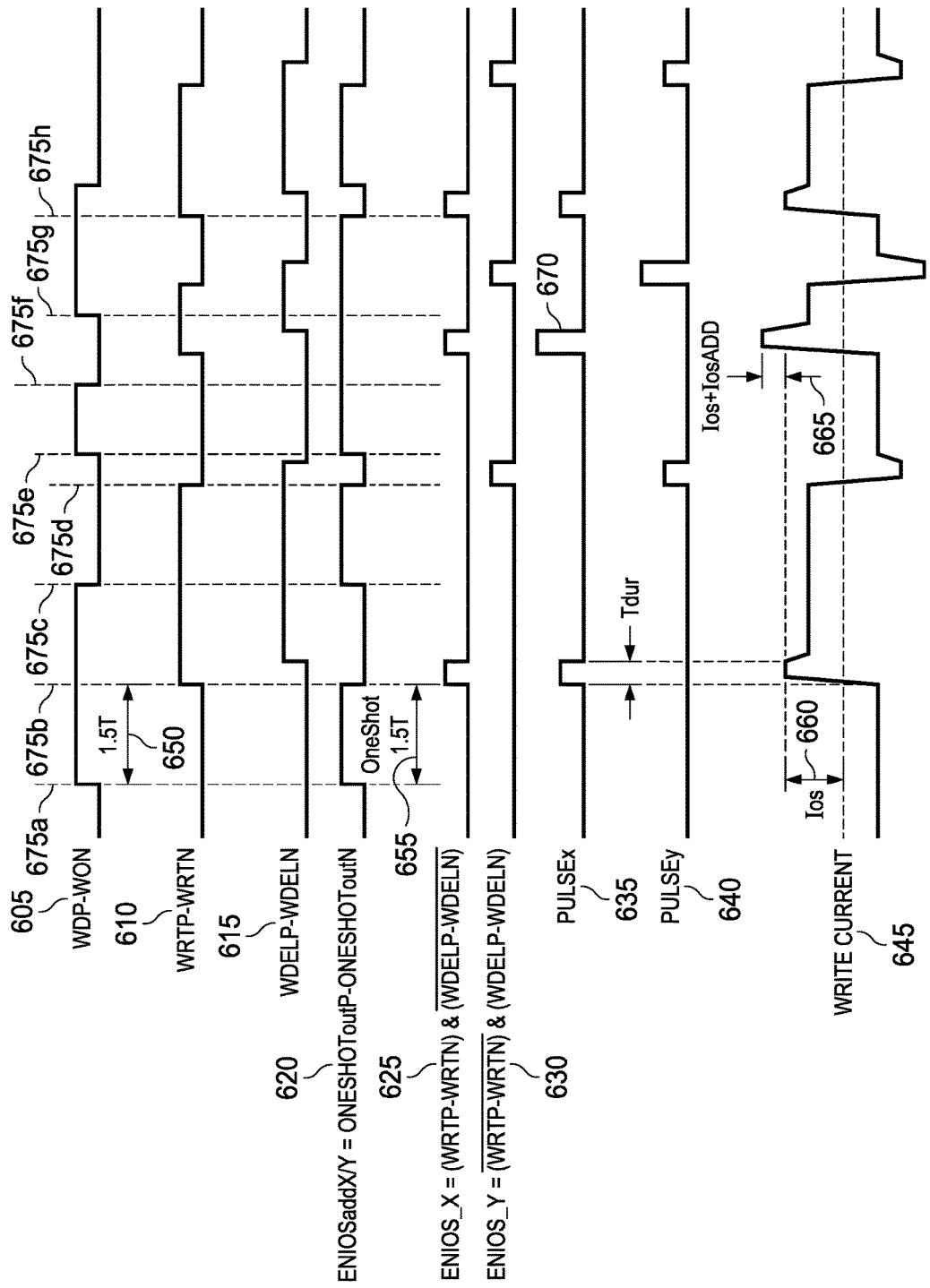

FIG. 6 depicts waveforms that illustrate the generation of overshoot adjustments by the write driver according to various embodiments that is described with respect to FIG. 5.

Figure 7:
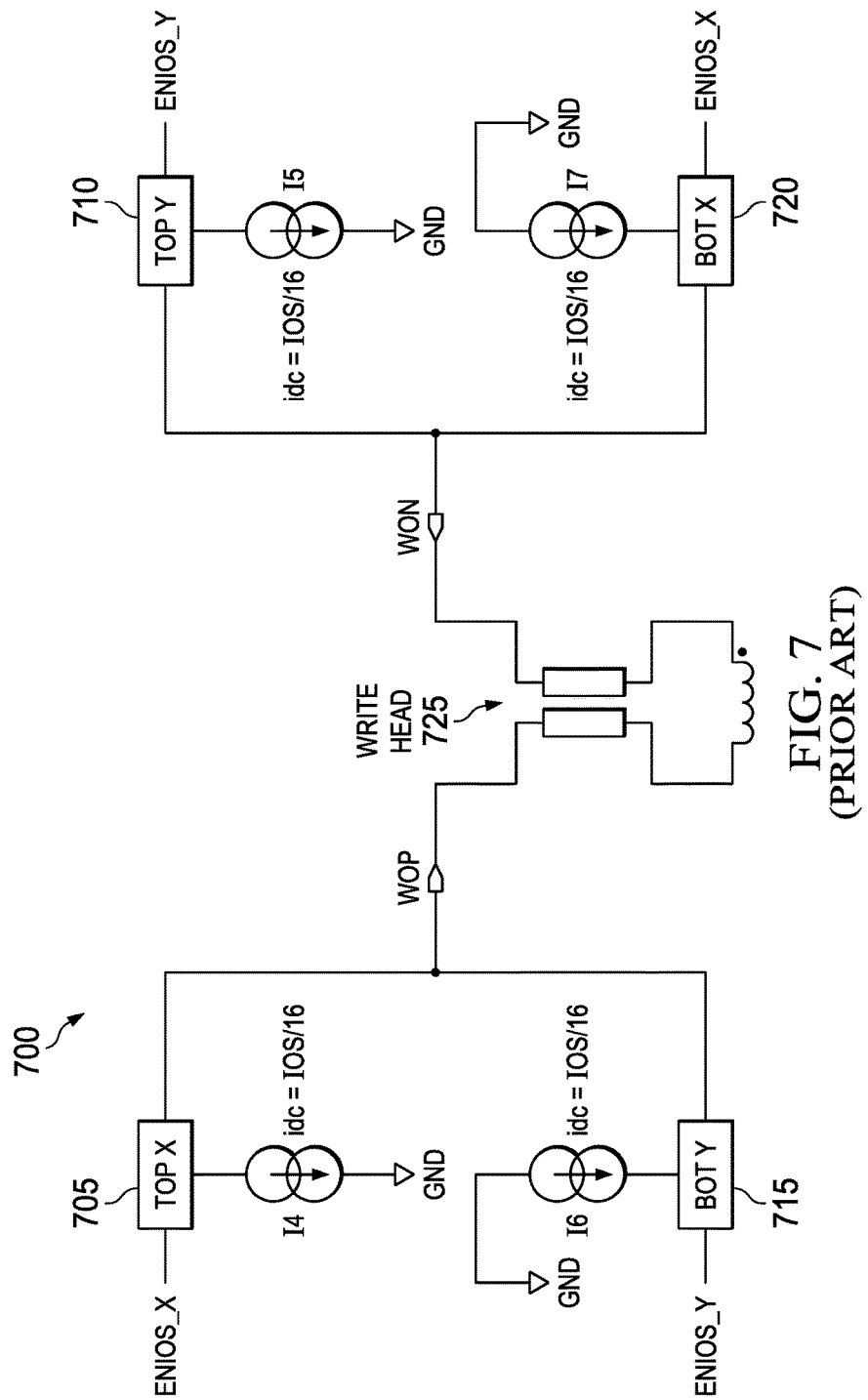

FIG. 7 is a circuit diagram illustrating certain components of a conventional H-bridge circuit used in a hard disk write driver system.

Figure 8:
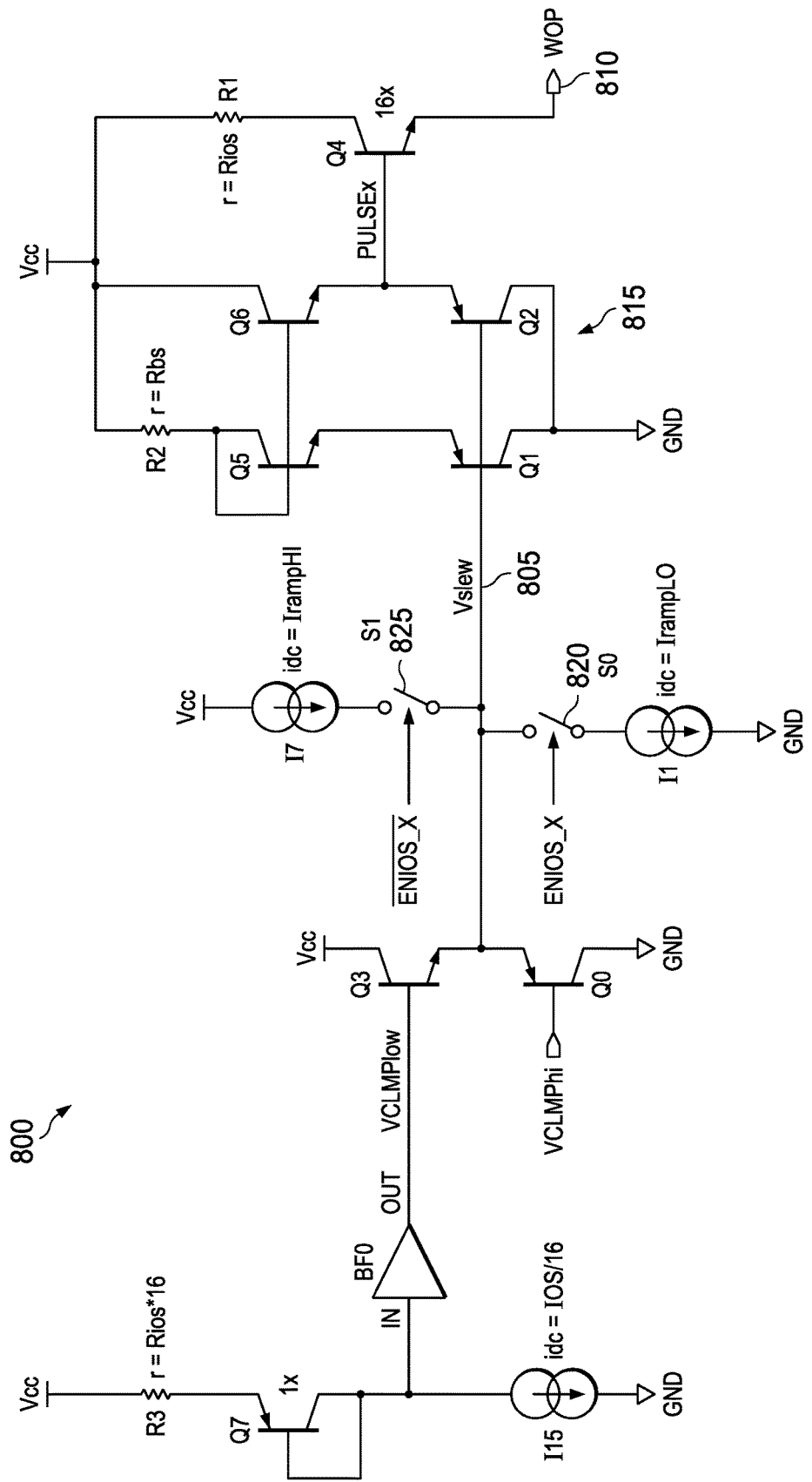

FIG. 8 is a circuit diagram illustrating certain components of one portion of a conventional H-bridge circuit used in a hard disk write driver system.

Figure 9:
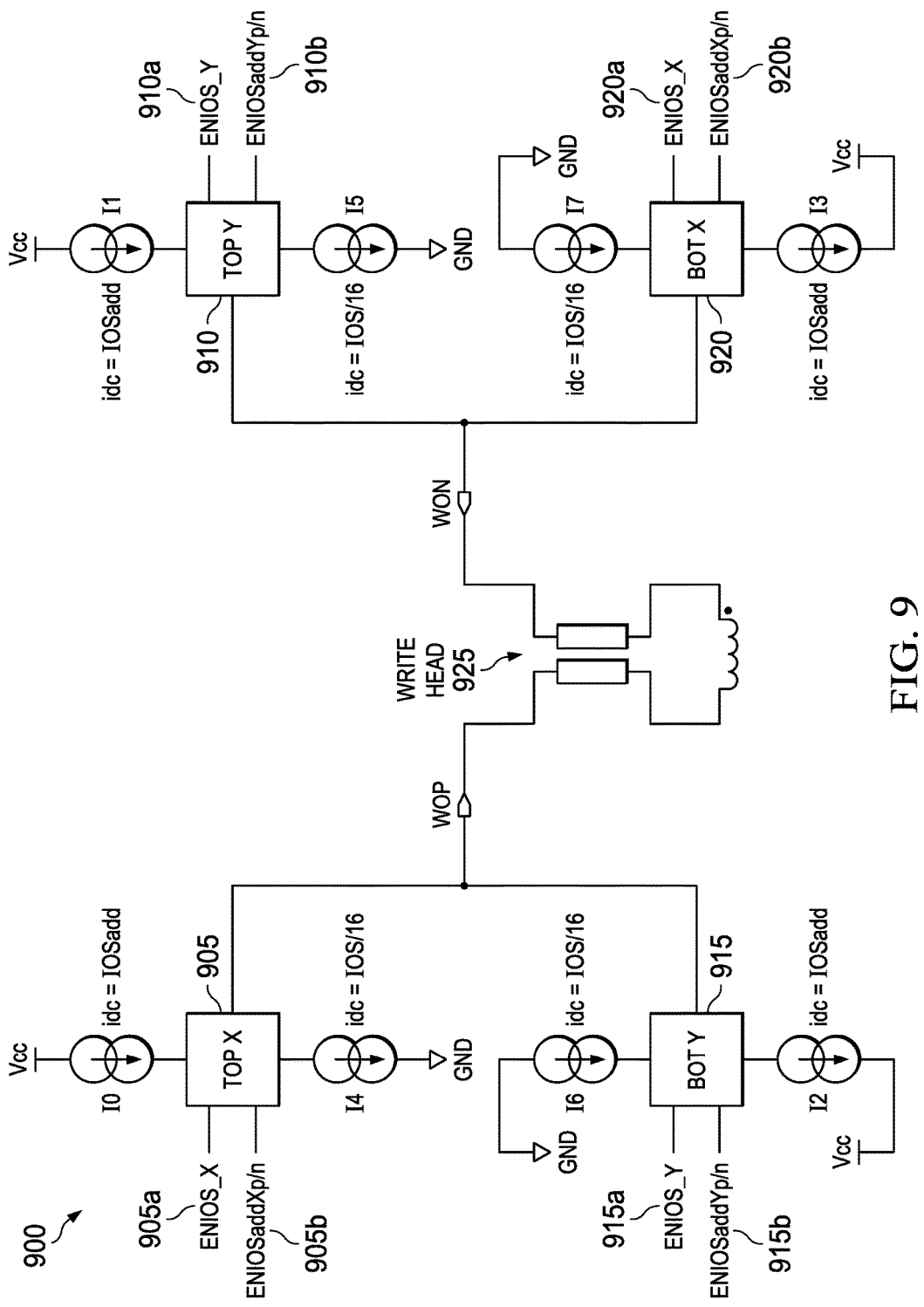

FIG. 9 is a circuit diagram illustrating certain components of an H-bridge circuit for a hard disk write driver system according to various embodiments.

Figure 10:
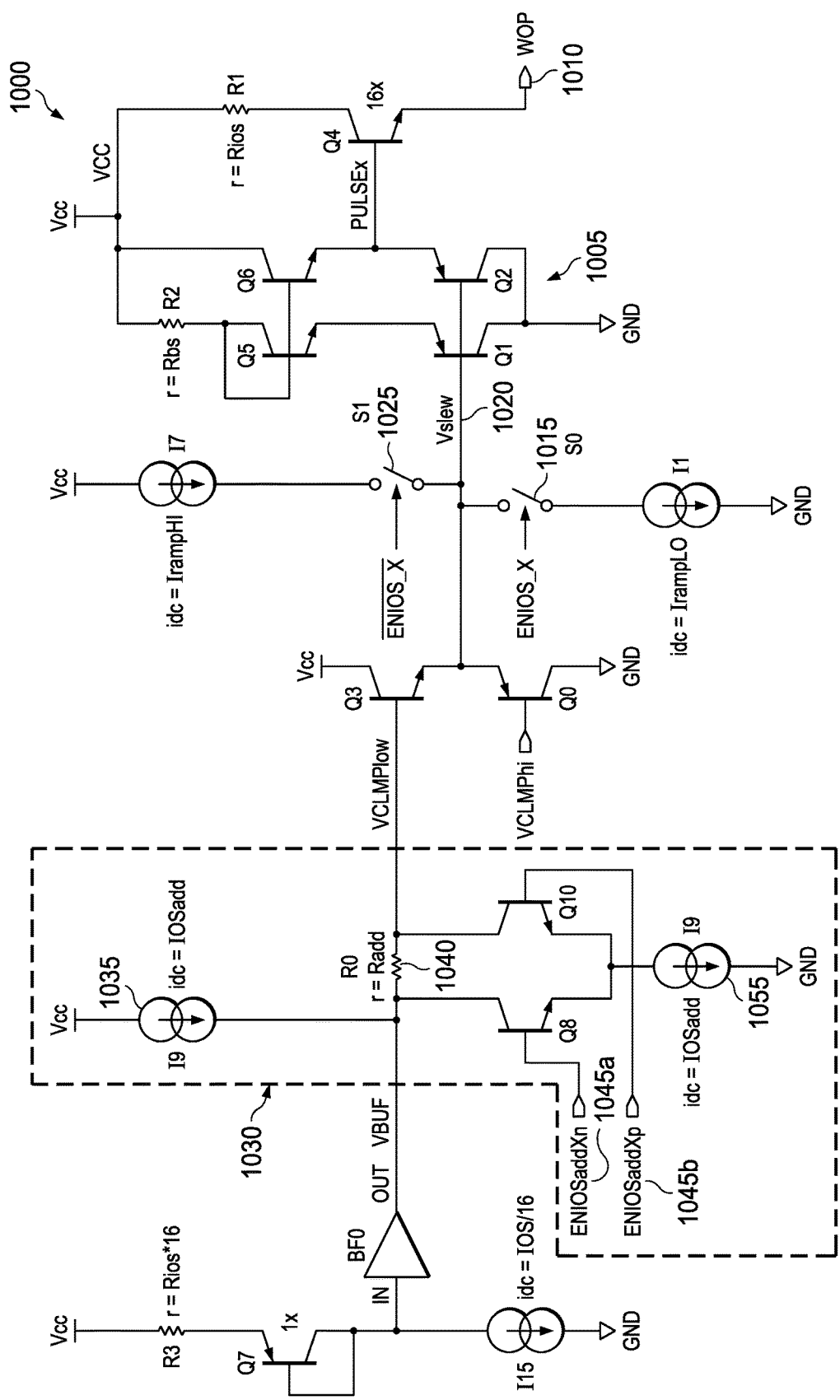

FIG. 10 is a circuit diagram illustrating certain components of one portion of an H-bridge circuit used in a hard disk write driver system according to various embodiments.

Figure 11:
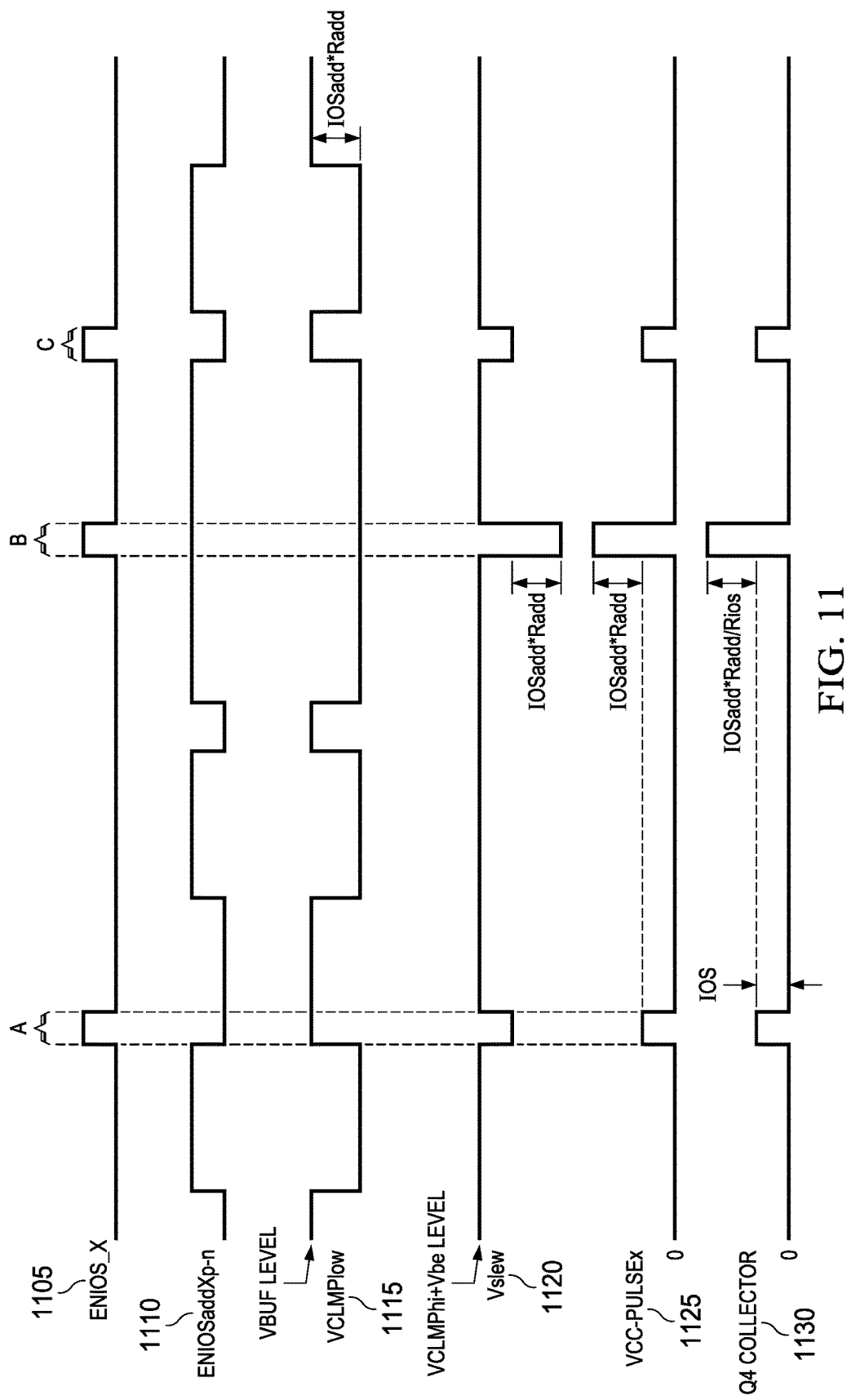

FIG. 11 depicts waveforms that illustrate the operation of the portion of the H-bridge circuit described with respect to FIG. 10.

Figure 12:
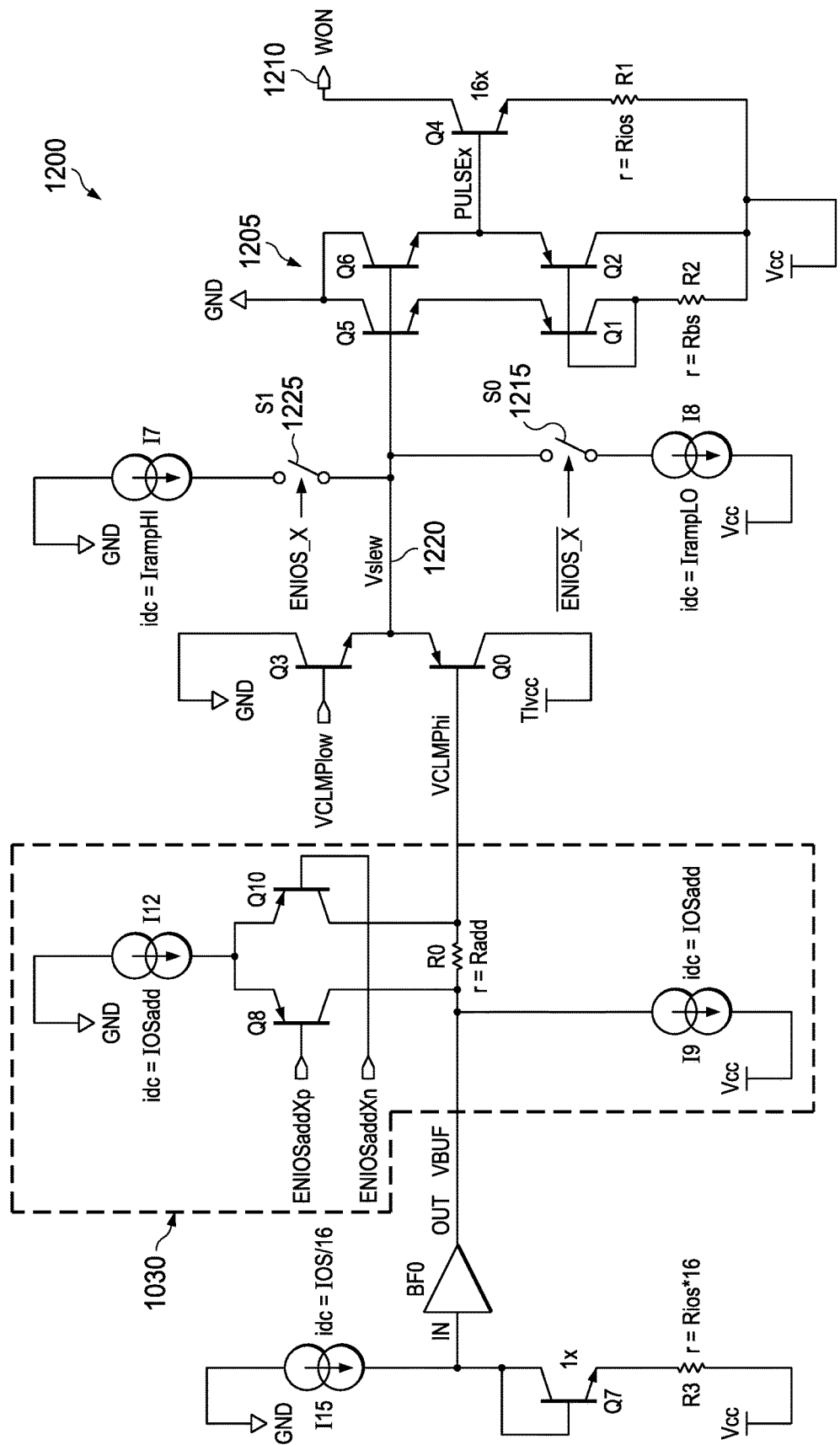

FIG. 12 is a circuit diagram illustrating certain components of one portion of an H-bridge circuit used in a hard disk write driver system according to various embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates waveforms for a write current signal 110 and a write data input signal 115, where these signals are generated in the conventional use of an overshoot adjustment to the write current. A conventional write driver circuit receives the write data input signal 115 and uses it to generate a write current signal 110 that is then transmitted to the write head where it can be decoded and written to a disk. An overshoot is generated by the write driver circuit and added to the write current 110. In a conventional write driver circuit that support overshoot, an identical overshoot is generated for each transition of the write data input 115.

In the conventional scenario illustrated in FIG. 1, an identical overshoot is generated and added to the write current signal 110 for every transition of the write data input 115. At transition 125 of the write data input 115, the write current signal 110 includes an overshoot 120. Each subsequent transition 130, 135, 140, 145, 150 of the write data input 115 is accompanied by an overshoot in the write current signal 110. In this conventional scenario, each overshoot adjustment that is added to the write current 110 is identical in amplitude and duration to overshoot 120 generated at transition 125, which has an amplitude, $I_{os}$, and a duration, $T_{dur}$. The amplitude and duration of an overshoot adjustment are both controlled by the write driver circuit that generates the write current and adds the overshoot adjustment to the write current.

Using a conventional write driver, the same overshoot adjustment is added at each transition of the write data input 115, regardless of the duration of current pulse associated with the transition. At transition 125 of the write data input 115 a current pulse of length 3 T begins, where T is the duration of the shortest pulse that is transmitted in the write data input 115. At transitions 130 and 145, current pulses of length 2 T begins. At transitions 135 and 140, current pulses of length 1 T begins. At each of these transitions, 125, 130, 135, 140, 145 in the write data input 115, the same overshoot adjustment is added to the write current 110 that is generated by the write driver.

FIG. 2 illustrates waveforms for the write current signal 210 and write data input signal 215, where the write current signal is generated with a write driver according to various embodiments. As with the conventional scenario described above, a write driver circuit according to embodiments receives a write data input signal 215 and uses it to generate a write current signal 210 that is then transmitted to the write head where it can be decoded and written to a disk. The waveforms of FIG. 2 illustrate the ability of a write driver according to various embodiments to generate two types of overshoot pulses, with one type of pulse being used to for overshoot adjustments for current pulses of length 1 T, and a second type of pulse used for overshoot adjustments in longer current pulses. Other embodiments may use different thresholds for determining the length of the current pulse that will trigger switching from one type of overshoot adjustment to another.

The waveforms of FIG. 2 illustrate the addition, according to various embodiments, of a first type of overshoot to the write current for current pulses of length 1 T and a second type of overshoot used for pulses longer the 1 T. In this scenario, one type is the overshoot adjustment 220 to the write current 210 at the first transition 225 of the write data input 215. As illustrated, the amplitude of overshoot adjustment 220 is $I_{os}$ and the duration of this overshoot is $T_{dur}$. Overshoot adjustments identical in amplitude and duration to this overshoot 220 are made to the leading edge of all pulses longer then 1 T in the write data input 115, namely at transitions 230 and 245.

A second type of overshoot for current pulses of length 1 T is the overshoot adjustment 225 to the write current 210 at transition 235 of the write data input 115. In this second type of overshoot 225, the amplitude of the current pulse that is added to the write current 210 is increased to $I_{os}+I_{osADD}$. Overshoot adjustments identical in amplitude and duration to this overshoot 225 are made to the leading edge of all pulses of length 1 T in the write data input 215, namely at transition 240. The amplitude of the additional overshoot current pulse $I_{osADD}$ may be configured according to various embodiments. In the scenario of FIG. 2, the duration $T_{dur}$ of the overshoot 225 is the same duration of the pulse used in the first type of overshoot 220. Other embodiments may utilize different overshoot pulse durations for the two different types of overshoot adjustments.

In certain embodiments, the use of the second type of pulse may be limited to scenarios where the write data input 215 is above a specified frequency. For instance, in the scenario of FIG. 2, the additional overshoot current pulse $I_{osADD}$ may only be added to the write current 210 if the mite data input 215 has a frequency greater than a predefined threshold. As described above, the higher the frequency being used in generating a square wave signal such as the write current 210 pulse train, the greater the distortion in the generated signal. With greater distortion in the write current 210 at higher frequencies, there is a greater need for an additional overshoot current pulse $I_{osADD}$ during short duration pulses in the write data input 215, specifically pulses of length 1 T in the write data input. As the shortest pulse, these length of these 1 T pulses provide the least amount of time for write data input 115 to be read by the write head before the next transition. Consequently, additional overshoot current at the leading edge of these 1 T patterns improves the ability of the write head to quickly detect a transition to these short patterns.

In order to generate the write current 210 that includes two types of overshoots that can be used with different current pulse durations in the write data input 215, a write driver circuit according to embodiments includes a component for determining the length of individual current pulses in the write data input 215 and a component for adjusting the characteristics of the overshoot that is applied to the write current 210 based on the determined length of the current pulse being encoded into the write current signal.

FIG. 3 illustrates circuit diagram that includes certain components of a conventional write driver 300 as described with respect to the waveforms of FIG. 1. As described with respect to FIG. 1, the conventional write driver circuit 300 of FIG. 3 adds an identical overshoot pulse to the write current at every transition of the write data input signal. FIG. 4 illustrates a set of waveforms that describe the operation of the conventional write driver circuit 300. The conventional write driver 300 receives a write data input signal 405 and outputs a write current signal 430 that is communicated to the write head 330 via transmission line 325.

An overshoot delay component 310 component of the conventional write driver circuit 300 receives the write data input 405. The overshoot delay component 310 has two sets of outputs. The first output signal 410 of the overshoot delay component 310 indicates that a rising edge transition has been detected in the write data input signal 405 and consequently duplicates the write data input signal with addition of a time delay. The rising edge of the first output signal 410 generated by the overshoot delay component 310 triggers the beginning of a positive overshoot current pulse to be added to the write current 430. The rising edge of the second output signal 415 generated the overshoot delay component 310 indicates the end of an ongoing positive overshoot current pulse. Consequently, the delay between the rising edge of the first input signal 415 and the rising edge of the second input signal specifies the duration of an overshoot current pulse that is added to the rising edge transition of the write current 430.

In a similar manner, the conventional write driver circuit 300 adds a current pulse to the falling edge transitions of the write current 430. The falling edge of the first output signal 410 indicates the detection of a falling edge transition in the write data input signal 405. The failing edge in the first output signal 410 triggers the beginning of a negative overshoot current pulse to be added to the write current 430. The falling edge of the second output signal 415 generated by the overshoot delay component 310 indicates the end of an ongoing negative overshoot current pulse.

The first output signal 410 and second output signal 415 generated by the overshoot delay component 310 are received as inputs by a write predriver 315 component of the conventional write driver circuit 300. Based on these inputs, the write predriver 315 generates two overshoot current pulse signals 420 and 425. The positive overshoot current pulse signal 420 indicates the addition of a positive current pulse to rising edges of the write current in generating the adjusted write current 430. The negative overshoot current pulse signal 425 indicates the addition of a negative current pulse to falling edges of the adjusted write current 430.

The write predriver 315 generates a rising edge in the positive overshoot current pulse signal 420 upon detecting arising edge in first output signal 410 of the overshoot delay component 310. The write predriver 315 generates a falling edge in the positive overshoot current pulse signal 420 upon detecting a rising edge in second output signal 415 of the overshoot delay component 310. In this manner, the positive overshoot current pulse signal 420 indicates the duration of a positive current pulse added to the write current 430. In the conventional write driver circuit 300, the duration of the positive overshoot current pulse signal 420 is $T_{dur}$ and the amplitude of the current pulse added to the write current 430 is $I_{os}$. In a similar manner, the write predriver 315 generates a negative overshoot current pulse signal 425 in response to detection falling edges in the first output signal 410 and the second output signal 415 of the overshoot delay component 310. A pulse in the negative overshoot current pulse signal 425 indicates negative current pulse is added to the write current 430 by the write driver circuit 300.

The output signals 420 and 425 of the write predriver 315 are received as inputs by an output driver 320 component of the write driver circuit 300. Upon detecting a rising edge in the positive overshoot current pulse signal 420, the output driver 320 begins a positive pulse to the write current 430 and ends this positive pulse upon detecting a falling edge in the positive overshoot current pulse signal 420. Similarly, upon detecting a rising edge in the negative overshoot current pulse signal 425, the output driver 320 begins a negative pulse to the write current 430 and ends this negative pulse upon detecting a falling edge in the negative overshoot current pulse signal 425. In the conventional write driver circuit 300, this process for adding overshoot current pulses is repeated for every transition detected in the write data input signal 405.

FIG. 5 is a schematic illustrating certain components of a write driver circuit 500 according to various embodiments. FIG. 6 illustrates certain waveforms associated with the operation of the write driver 500. As described with respect to FIG. 2, the write driver circuit 500 according to various embodiments receives a write data input signal 605 and generates a write current signal 645 that is then transmitted to the write head where it can be decoded and written to a disk. The waveforms of FIG. 6 illustrate the ability of write driver 500 to generate two types of overshoot pulses, with one type of pulse being used in overshoot adjustments to the leading edge of current pulses of length 1 T in the write current signal 645, and a second type used for overshoot adjustments to the leading edge of pulses longer than 1 T the write current signal.

In the write driver 500, the data of the write data input signal 605 is processed in two parallel pathways. The path depicted as the top path in FIG. 5 begins with a delay component 510. This delay component 510 adds a programmable time delay to all edges of the write data input signal 605. In the scenario illustrated in FIG. 6, the delayed write data signal 610 that is generated by the delay component 510 introduces a 1.5 T delay 650 in the write data input signal 605. The delay component 510 is programmable and may be configured to introduce time delays other than 1.5 T. As described in more detail below, the length of this programmable delay is selected according to certain embodiments based on the length of the shortest pattern in the data input signal 605. In such embodiments, the length of the delay is programmed to be longer than the shortest pattern, 1 T, of the data input signal 605, but shorter than 2 T.

The top pathway of write driver 500 continues with the delayed write data signal 610 generated by the delay component 510 being provided as an input to an overshoot delay component 515. The overshoot delay component 515 generates two sets of outputs based on the delayed write data signal 610. The first output 610 of the overshoot delay component 515 mirrors the delayed write data signal 610 that is generated by the delay component 510. The rising edge of transitions in this first output 610 of the overshoot delay component 515 indicates the beginning of an overshoot pulse. The second output 615 of the overshoot delay component 515 is a time-delayed version of the first output 610. This second output 615 of the overshoot delay component 515 indicates the end of an overshoot pulse. Consequently, the delay added to the second output 615 by the overshoot delay component 515 specifies the time duration, $T_{dur}$, of overshoot pulses to be generated by the write driver 500.

The first output signal 610 and second output signal 615 generated by the overshoot delay component 515 are received as inputs by a write predriver 520 component of the write driver circuit 500. The write predriver 520 generates two overshoot signals 625 and 630. The positive overshoot signal 625 indicates the addition of a positive current pulse to the write current 645. The negative overshoot signal 630 indicates the addition of a negative current pulse to the write current 645.

The write predriver 520 generates a rising edge in the positive overshoot signal 625 upon detecting a rising edge in first output signal 610 of the overshoot delay component 515. The write predriver 520 generates a falling edge in the positive overshoot signal 625 upon detecting a rising edge in second output signal 615 of the write delay driver 515. In this manner, the positive overshoot signal 625 is used to generate a positive current pulse of the specified duration to be added to the write current 645. In a similar manner, the write predriver 520 generates a rising edge in the negative overshoot signal 630 in response to detecting a falling edge in the first output signal 410 and falling edge in the negative overshoot signal 630 in response detecting a falling edge in the second output signal 415 of the write delay driver 515. The negative overshoot signal 625 is used to generate a current pulse that will be inverted and added to the write current 645 to create a negative current pulse. These positive and negative overshoot signals, 625 and 630, are output by the write predriver 520 and provided as inputs to an overshoot add-on component 560.

In the bottom path of the write driver circuit 500, the data input signal 605 is an input to the one shot timer 525. Additional details of the operation and implementation of the one shot timer 525 are described in co-pending application Ser. No. 14/974,034. The one shot timer 525 is configured to generate a pair of outputs that indicates whether the write driver 500 will generate a normal overshoot, $I_{os}$, or an additional overshoot, $I_{os}+I_{osADD}$, for each transition in the data input signal 605. The one shot timer has two outputs that are differenced to generate the signal depicted as waveform 620. As illustrated in FIG. 6, the one shot timer 525 generates a timed pulse in signal 620 in response to the detection of each edge, whether rising or falling, in the data input signal 605. For instance, one shot time 525 generates a rising edge of a timed pulse in signal 620 at time 675a in response to detecting a rising edge in the data input signal 605. The one shot timer 525 is further configured to maintain the signal 620 at a high state for a specified duration 655, thus generating a timed pulse in this signal. After this duration 655, the timed pulse in output 620 times out at time 675b and output 620 drops back to a low state. The one shot timer 525 initiates another timed pulse in the output signal 620 at time 675c in response to detecting a falling edge in the data input signal 605. As before, the timed pulse in output signal 620 times out after the specified duration at time 675d. At time 675e, a rising edge in the data input signal 605 triggers another timed pulse in the output signal 620 of the one shot timer 525.

Prior to time 675e, the initiation of each timed pulse by the one shot timer 525 results in the output signal 620 being raised from a low state to a high state. At time 675f, the falling edge in the data input signal 605 again triggers a timed pulse in the output signal 620. However, at time 675f, the output signal 620 of the one shot timer is already in a high state. Consequently, the falling edge in the data input signal 605 triggers a reset of the timed pulse being generated by the one shot timer 525 such that the output signal 620 will be maintained at a high state. Further edges in the data input signal 605, such as the rising edge at time 675g, will continue to reset the timed pulse being generated by the one shot timer 525 such that it is maintained in a high state. Only after no edge is detected in data input signal 605 for longer than the pulse duration 655, does the pulse generated by the one shot timer 525 time out and revert to a low state, such as at time 675h.

This timed pulse generated in signal 620 by one shot timer 525 is used to identify patterns in the data signal of length longer than the duration of the timed pulse. In certain embodiments, the duration 655 of a one shot timer pulse in signal 620 is the same as the delay programmed for delay component 510. In the illustrated embodiments, the duration 655 of this programmed delay is 1.5 T. As with the delay introduced by delay component 515, the duration of the timed pulse is selected such it is longer than the shortest pattern, 1 T, of the data input signal 605, but shorter than 2 T.

The output 620 of the one shot timer 525 and the positive and negative overshoot signals 625 and 630 that are generated by the write predriver 520 are provided as inputs to the overshoot add-on component 560. Based on these inputs, the overshoot add-on component 560 generates positive and negative overshoot pulse signals 635 and 640 that specify the overshoot adjustment that will be made to the write current signal 645. The positive overshoot adjustments are specified by the positive overshoot pulse signal 635. The overshoot add-on component 560 generates the positive overshoot pulse signal 635 based on the positive overshoot signal 625 provided from the top path of the write driver circuit 500 and output 620 of the one shot timer 525. For each pulse encountered in the positive overshoot signal 625, the overshoot add-on component 560 generates a corresponding pulse in the positive overshoot pulse signal 635. For instance, a positive pulse is generated in the positive overshoot pulse signal 635 at time 675b, in response to the detection of a positive pulse in the positive overshoot signal 625.

The magnitude of current pulses in the positive overshoot pulse signal 635 are determined by the overshoot add-on component 560 based on the state of the one shot timer output signal 620. At time 675b, the one shot timer output signal 620 is low. Consequently, the overshoot pulse at time 675b in overshoot pulse signal 635 is a standard overshoot pulse of magnitude that is added to the leading edge of transition 660 in the write current 645 that begins at time 675b. At the next positive pulse in the positive overshoot signal 625 between times 675f and 675g, the one shot output signal 620 is high. As a result, the overshoot add-on component generates a larger pulse 670 in the positive overshoot pulse signal 635. This larger pulse 670 results in an additional overshoot pulse of magnitude, $I_{os}+I_{osADD}$, being added to the leading edge of the corresponding transition 665 in the write current 645. At time 675h, the overshoot add-on component 560 encounters another pulse in the positive overshoot signal 625. At time 675h, the prior pulse in the one shot timer output signal 620 times out and is now in a low state. Consequently, no additional overshoot, $I_{osADD}$, is added to the positive overshoot signal 625 and the overshoot add-on component 560 adds only the standard overshoot current, $I_{os}$, to the positive overshoot signal 625.

In this same manner, the overshoot add-on component 560 determines, at each pulse encountered in the negative overshoot signal 630, whether to add a standard overshoot current, $I_{osADD}$, or an additional overshoot current, $I_{os}+I_{osADD}$, to the negative overshoot signal 640, with this determination also based on the state of the one shot timer output signal 620 as described above for the positive overshoot current.

The positive and negative overshoot signals, 635 and 640, generated by the overshoot add-on component 560 are provided as inputs to an output driver 535, which generates the write current signal 645 by adding the overshoot current pulses provided in the positive and negative overshoot signals, 635 and 640, to the leading edges of corresponding transitions in the write current signal. The write current signal 645, now including overshoot adjustments, is then communicated via a transmission line 540 to the write head 545 where the data in the signal can be written to the disk of the HDD system.

FIG. 7 is a circuit diagram depicting certain elements of an H-bridge circuit 700 used to add a conventional overshoot pulse to a write current signal. The H-bridge circuit 700 allows current to be driven through the write head 725 in either direction. When the write current is driven in one direction, a magnetic field is created by the write head 725 in a specified direction, and when the write current is driven in the opposite direction, a magnetic field is created by the write head 725 in the opposite direction. The H-bridge circuit 700 operates to feed the write current through the write head 725 in each direction by engaging pairs of switching elements. In the illustrated H-bridge circuit 700, the write current flows from WON to WOP through the write head 725 when switching elements 705 and 720 are turned on and switching elements 715 and 710 are off. Similarly, current flows the opposite direction, from WOP to WON, when switching elements 715 and 710 are turned on and switching elements 705 and 720 are off.

The conventional H-bridge circuit 700 receives the write current in the form of a first input signal at switching elements 705 and 720 and a second input signal at switching elements 715 and 710. Referencing FIGS. 3 and 4, these two inputs to the conventional H-bridge circuit 700 are overshoot current pulse signals 420 and 425 generated by the write predriver 315. The positive overshoot current pulse signal 420 indicates the addition of a positive current pulse to rising edges of the write current in generating the adjusted write current 430. The negative overshoot current pulse signal 425 indicates the addition of a negative current pulse to falling edges of the adjusted write current 430. The conventional H-bridge circuit 700 is configured to add the same overshoot adjustment to all overshoot current pulses.

FIG. 8 is a circuit diagram illustrating certain components of a conventional switching element 800, in particular switching element 705 described with respect to the conventional H-bridge circuit 700 of FIG. 7. Circuit diagrams and a description of the operation of switching elements 710, 715 and 720 are not provided, but are implemented in the same manner as the described conventional switching element 705. The conventional switching element 800 generates certain aspects of the write current signal. When switching element 800 is turned on, the write current signal flows to the write head via the WOP terminal 810. When switching element 800 is turned off, no write current signal flows on the WOP terminal 810.

The switching element 800 has two inputs 820 and 825 that indicate overshoot pulses in the write current signal. Input signal 820 indicates the addition of a positive overshoot to the write current signal. Input signal 825 is the inverse of input signal 820, thus indicating intervals where no overshoot is added to the write current signal.

When input signal 820 is high, current I1 flows to the $V_{SLEW}$ 805, such that the voltage at the $V_{SLEW}$ node voltage is $V_{CLMPlow}$ reduced by the $V_{be}$ of the Q3 transistor. This voltage on the $V_{SLEW}$ node 805 activates the AB-class output stage amplifier 815 and PULSEx thus follows the voltage on $V_{SLEW}$ node increased by one $V_{be}$. As a result, PULSEx is equal to $V_{CLMPlow}$. Based on the properties of the output stage transistor Q4 and input stage transistor Q7, the output current at the WOP terminal 810 is 16 times greater than the input current to the conventional switching element 800 at transistor Q7. The values for the $V_{SLEW}$ node 805 input currents I0, $I_{rampLO}$, and I7, $I_{rampHI}$, are selected based on the maximum data rate in the write current signal for which the $V_{SLEW}$ node 805 voltage can settle during the shortest pattern 1 T in the write current signal.

When input signal 820 goes low and input signal 825 goes high, current I7 flows to the $V_{SLEW}$ node 805, such that the voltage at the $V_{SLEW}$ node voltage is $V_{CLMPhi}$ added to the $V_{be}$ of the Q0 transistor. This voltage on the $V_{SLEW}$ node is sufficient to turn off the PNP transistor Q4 and shut off the write current on the WOP terminal 810. Referring to FIG. 7, switching element 720 operates similarly using a complimentary transistor configuration to the switching element 705 described in FIG. 8. Together, switching elements 720 and 705 operate to write positive overshoot pulses to the write signal. Likewise, switching element 715 and 710 operate to write negative overshoot pulses to the write signal.

FIG. 9 is a circuit diagram depicting certain elements of an H-bridge circuit 900 according to various embodiments. The H-bridge circuit 900 adds a standard overshoot pulse to a write current signal to pattern transitions in the write current signal and adds an additional overshoot pulse to the transition of patterns shorter than a specified duration. The H-bridge circuit 900 allows current to be driven through the write head 925 in either direction. When the write current is driven in one direction, a magnetic field is created by the write head 925 in a specified direction, and when the write current is driven in the opposite direction, a magnetic field is created by the write head 925 in the opposite direction. The H-bridge circuit 900 operates to feed the write current through the write head 925 in each direction by engaging pairs of switching elements. In the H-bridge circuit 900, the write current flows from WON to WOP through the write head 925 when switching elements 905 and 920 are turned on and switching elements 915 and 910 are off. Similarly, current flows the opposite direction, from WOP to WON, when switching elements 915 and 910 are turned on and switching elements 905 and 920 are off.

The H-bridge circuit 900 receives the write current in the form of a first input signal, 905a and 920a, at switching elements 905 and 920 and a second input signal, 915a and 910a, at switching elements 915 and 910. Referencing FIGS. 5 and 6, these two inputs to the H-bridge circuit 900 are overshoot current pulse signals 625 and 635 generated by the write predriver 520. The positive overshoot current pulse signal 625 indicates the addition of a positive current pulse to rising edges of the write current in generating the adjusted write current 645. The negative overshoot current pulse signal 630 indicates the addition of a negative current pulse to falling edges of the adjusted write current 645. Based on the first input signal, 905a and 920a, and the second input signal, 915a and 910a, the H-bridge circuit 900 is configured to add a standard overshoot pulse to all pattern transitions in the write current signal.

The H-bridge circuit 900 receives an additional overshoot signal in the form of a first overshoot signal, 905b and 920b, at switching elements 905 and 920 and a second overshoot signal, 915b and 910b, at switching elements 915 and 910. Each of the overshoot signals, 905b, 910b, 915b and 920b are differential signals. Each of the four switching elements, 905, 910, 915 and 920, that comprise the H-bridge circuit 900 also receives reference current, $I_{OSadd}$, as an input. Each of the four switching elements, 905, 910, 915 and 920, is configured to add the additional overshoot current provided by $I_{OSadd}$ to pattern transitions specified by the first and second overshoot signals 905b, 910b, 915b and 920b.

FIG. 10 is a circuit diagram illustrating certain components of a switching element 1000 according to various embodiments. In particular, FIG. 10 illustrates a switching element 1000 corresponding to switching element 905 described with respect to the H-bridge circuit 900 of FIG. 9. The switching element 1000 generates certain aspects of the write current signal. When switching element 1000 is turned on, the write current signal flows to the write head via the WOP terminal 1010. When switching element 905 is turned off, no write current signal flows on the WOP terminal 1010.

The switching element 1000 has two inputs 1025 and 1015 that indicate standard overshoot pulses in the write current signal. Input signal 1015 indicates the addition of a standard, positive overshoot to the write current signal. Input signal 1025 is the inverse of input signal 1015, thus indicating intervals where no overshoot pulse is added to the write current signal. The input signal 1015 corresponds to input 905a of the H-bridge circuit 900. The switching element 1000 has two additional input signals 1045a and 1045b that are used by the switching element 1000 to determine whether to add an additional overshoot pulse to the standard overshoot pulse. The input signals 1045a and 1045b correspond the differential input 905b of the H-bridge circuit 900. Another input received by the switching element 1000 is the reference current 1035 and 1055 specifying the additional overshoot current, $I_{OSadd}$.

FIG. 11 illustrates certain waveforms associated with the operation of the switching element 1000. The switching element 1000 receives an input signal 1015, represented by waveform 1105 in FIG. 11, that indicates the addition of a standard, positive overshoot to the write current signal. The waveform 1105 of input signal 1015 illustrates the addition of overshoot pulses during intervals A, and C. The overshoot pulses indicated in waveform 1105 are standard overshoot pulses added to each pattern transition of the write current signal. The switching element 1000 also receives differential input signals 1045a and 1045b, represented by waveform 1110 in FIG. 11, that indicate the addition of an additional overshoot current pulse.

Referring to the switching element 1000 circuit diagram of FIG. 10, when input signal 1015 is high, a standard positive overshoot is added in the write current signal as described with respect to FIG. 8. Conversely, no overshoot is added by switching element 1000 when input signal 1015 is low. As before, a high value in the inverse input signal 1025 results in a voltage at the $V_{SLEW}$ node voltage is $V_{CLMPhi}$ added to the $V_{be}$ of the Q0 transistor. This voltage on the $V_{SLEW}$ node is sufficient to turn off the PNP transistor Q4 and shut off the write current on the WOP terminal 1010 such that no overshoot is added.

The switching element 1000 is configured to add a standard overshoot to the write current and, under certain conditions, also add an additional overshoot pulse to the write current. A high value of input signal 1015 results in voltage at the $V_{SLEW}$ node voltage of $V_{CLMPlow}$ reduced by the $V_{be}$ of the Q3 transistor. As opposed to the conventional switching element 800 of FIG. 8, $V_{CLMPlow}$ may be further modified by the additional overshoot component 1030. If differential input 1045a is less than differential input 1045b, such that waveform 1110 in FIG. 11 is low, the additional overshoot is not added.

When differential input 1045a is less than differential input 1045b, transistor Q8 of the additional overshoot component 1030 is switched on such that current 112, 1055, is diverted to buffer gate 1040. This cancels the current from 19, 1035 such that no additional overshoot from 112, 1055, is added to the output of buffer gate 1040 and $V_{CLMPlow} = V_{BUF}$. As a result, the switching element 1000 adds only the standard overshoot to WOP at output terminal 1010 where the standard overshoot current is specified by 115 multiplied by 16 by the operation of the output stage amplifier 1005 and transistor Q4.

When differential input 1045a is greater than differential input 1045b, transistor Q10 of the additional overshoot components 1030 is switched on such that current 112, 1055, is diverted to buffer gate 1040. Additional overshoot current 112, 1055, is in diverted to buffer gate 1040 and again cancels the current 19, 1035 at the output of buffer gate 1040. However, current 112 now creates a voltage drop across resistor RO and cancels the current 19. Due to the voltage drop caused by R0, $V_{CLMPlow}$ is now lowered by $R_{add}*I_{osadd}$, where $R_{add}$ is the resistance of RO and $I_{osadd}$ is the additional overshoot current provided as in input current 112, 1055. This voltage drop propagates to $V_{SLEW}$ node 1020 and to the output stage AB-class amplifier 1005 and transistor Q4. This voltage drop results in an increase in output current at transistor Q4 of approximately $R_{add}*I_{OSadd}/R_{ios}$, where $R_{ios}$ is the resistance of output stage resistor R1. In this manner the state of differential inputs 1045a and 1045b are used to determine when an additional overshoot adjustment is added to a standard overshoot specified by input signal 1015.

Referring to the waveforms of FIG. 11, waveform 1105 depicts input signal 1015 from FIG. 10 and specifies intervals A, B and C during which a standard overshoot is applied. Waveform 1110 depicts the state of differential inputs 1045a and 1045b from FIG. 10. Also depicted from FIG. 10 in waveform 1115 is $V_{CLMPlow}$, which is the output of the additional overshoot component 1030. As described, for a low value in input signal 1110 (where input 1045a is less than input 1045b), $V_{CLMPlow}=V_{BUF}$, where $V_{BUF}$ is the gate buffer 1040. During such intervals, only the standard overshoot current, $I_{os}$, is added to the write current. A high value in input signal 1110 (where input 1045a is greater than input 1045b). $V_{CLMPlow}$ is reduced below $V_{BUF}$ by $R_{add}*I_{OSadd}$. As such, waveform 1115 depicting $V_{CLMPlow}$ is an inverse of the differential inputs 1045a and 1045b of waveform 1110. Waveform 1120 illustrates the voltage at $V_{SLEW}$ node 1020 of FIG. 10. As described, $V_{CLMPhi}+V_{be}$, the voltage at $V_{SLEW}$ node turns off transistor Q4 and cuts of the write current output. Based on the input signal 1015 illustrated in waveform 1105 the voltage at $V_{SLEW}$ node 1020 drops, thus allowing current to flow and either the standard overshoot, $I_{os}$, or the additional overshoot, $I_{os}+I_{OSadd}$, is added to the write current.

Thus, waveforms 1120 and 1115 illustrate that during intervals A and C, input signal 1105 is high, specifying an overshoot pulse, and $V_{CLMPlow}$ 1115 is high, specifying the addition of the standard overshoot pulse, $I_{os}$. These waveforms further illustrate that during interval B, an overshoot pulse is specified by a high input signal 1105, but $V_{CLMPlow}$ 1115 has now dropped to a low state due to differential inputs 1045a and 1045b such that the voltage at $V_{SLEW}$ node, 1120, has dropped by $R_{add}*I_{OSadd}$ during interval B, thus resulting in additional overshoot current added to the write current.

Waveform 1125 illustrates the voltage, relative to $V_{CC}$, at the base of transistor Q4 of switching element 1000. In particular, waveform 1125 illustrated that, during intervals A and C, the output voltage 1125 is increased in response to the lower $V_{SLEW}$ voltage 1120 allowing an overshoot current to flow via transistor Q4. During interval B, the output voltage 1125 increases further by $R_{add}*I_{OSadd}$ due to the further drop in the $V_{SLEW}$ voltage 1120.

Waveform 1130 illustrates the collector current of transistor Q4, and thus the overshoot current added to write current at output terminal 1010 by the switching element 1000. As illustrated, during intervals A and C, the collector current 1130 is allowed to flow due to the drop in $V_{SLEW}$ voltage 1120 activating transistor Q4. This increase in collector current 1130 is the standard overshoot current, $I_{os}$. During interval B, the further reduction in $V_{SLEW}$ voltage 1120 results in the collector current 1130 being increased by $R_{add}*I_{OSadd}/R_{ios}$, thus adding the additional overshoot current to pulses.

With reference to waveform 620 of FIG. 6, the differential inputs 1045a and 1045b of waveform 1110 represent intervals where the one-shot timer described with respect to FIG. 5-6 generates 1.5 T pulses in response to edges in the write current, serving to identify 1 T patterns in the write current. As such, the differential inputs 1045a and 1045b are utilized by the switching element 1000 to generate two types of overshoot pulses, with one type of pulse being used in overshoot adjustments to the leading edge of current pulses of length 1 T in the write current signal, and a second type used for overshoot adjustments to the leading edge of pulses longer than 1 T in the write current signal.

FIG. 12 is a circuit diagram illustrating certain components of the switching element 920 of the H-bridge circuit 900 of FIG. 9 that is complimentary to the switching element 905 that is described in detail with respect to FIGS. 10 and 11. In the switching element 1200, complimentary transistors are used in a mirrored configuration to the switching element 1000 of FIG. 10. Switching element 1200 functions in the same manner as the switching element described with respect to FIGS. 10 and 11, except that switching element 1000 is configured to source the positive overshoot in the write current to the write head 925 on terminal WOP and switching elements 1200 is configured to sink the positive overshoot write current from write head on terminal WON. Similarly, complimentary switching elements 910 and 915 are configured to source and sink the negative overshoot write current through the write head 925.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A switching element circuit comprising:
 (a) an output transistor having a control input, a source lead connected to a power supply, and an output;
 (b) an output stage amplifier having a control input, a source lead connected to the power supply, and an output connected to the control input of the output transistor;
 (c) switching circuitry connected between the power supply and ground and having a central node connected to the control input of the output stage amplifier, the switching circuitry controlling application of an overshoot current to the central node;
 (d) transistor circuitry connected between the power supply and ground, having a control input, and having a central node connected to the central node of the switching circuitry;
 (e) buffer circuitry having an input and an output;
 (f) current source circuitry connected between the power supply and ground and having a central node connected to the buffer circuitry input; and (g) additional overshoot current circuitry connected between the power supply and ground, having an input connected to the output of the buffer circuitry, and an output connected to the control input of the transistor circuitry.

2. The switching element circuit of claim 1 in which the additional overshoot current circuitry includes a resistor connected between the input and output of the additional overshoot current circuitry, and a first added current source circuit connected between the power source and the input of the additional overshot current circuitry.

3. The switching element circuit of claim 1 in which the additional overshoot current circuitry includes a resistor having two ends connected between the input and output of the additional overshoot current circuitry, a first transistor having a lead connected to one end of the resistor, a second transistor having a lead connected to the other end of the resistor, and a second added current source connected between the transistors and the ground.

4. The switching element circuit of claim 1 in which the additional overshoot current circuitry includes:
- a resistor having two ends connected between the input and output of the additional overshoot current circuitry;
- a first transistor having a lead connected to one end of the resistor and an added overshoot current control input;
- a second transistor having a lead connected to the other end of the resistor, and an added overshoot current control input; and
- a second added current source connected between the transistors and the ground.

* * * * *